July 15, 1952  W. A. SPIERS  2,602,961

VULCANIZING APPARATUS FOR V-BELTS

Filed June 9, 1949  3 Sheets-Sheet 1

INVENTOR.
WALTER A. SPIERS
BY Willard D. Eakin
Attorney

July 15, 1952 W. A. SPIERS 2,602,961
VULCANIZING APPARATUS FOR V-BELTS
Filed June 9, 1949 3 Sheets-Sheet 2

INVENTOR.
WALTERS A. SPIERS
BY
*Willard D. Eakin*
Attorney

July 15, 1952    W. A. SPIERS    2,602,961
VULCANIZING APPARATUS FOR V-BELTS
Filed June 9, 1949    3 Sheets-Sheet 3

INVENTOR.
WALTER A. SPIERS
BY Willard D. Eakin
Attorney

Patented July 15, 1952

2,602,961

UNITED STATES PATENT OFFICE 2,602,961

VULCANIZING APPARATUS FOR V-BELTS

Walter A. Spiers, Akron, Ohio

Application June 9, 1949, Serial No. 97,979

22 Claims. (Cl. 18—17)

This invention relates to molding apparatus and especially but not exclusively to apparatus for molding annular articles.

The specific embodiments shown in the accompanying drawings are especially adapted for the molding and vulcanizing of power-transmitting belts of the V or side-driving type.

My chief objects are to provide economical and rapid apparatus for molding a large number of articles in each cycle of operations; to provide improved means for pressing all parts of an annular article radially outward in an annular mold cavity, as for tensioning the reinforcing core or tensioning element of a V-belt, for example; to provide improved means for automatically opening and closing successive molds of a stack of molds in a press as the press is opened and closed; to provide for the opening or closing of the molds in succession as they respectively pass a work-table structure; to provide compactness of apparatus, as by providing a work-table structure adapted to serve also as a means for confining air or steam for pressing the work in the mold cavities and/or for providing vulcanizing heat; to provide for the use of a press of great height, for large capacity, without requiring the filling and emptying of the molds at any inconvenient height; to provide, in conjunction with other features, for the use of a motor-driven press; and to provide other advantages that will be manifest.

In the embodiment shown in Figs. 1 to 4 the press comprises a stationary base 10 having a central mold-supporting platform 11, which can be of different height if a different number of double-faced mold members $12^a$ to $12^g$ are installed. The upper, movable member 13 of the press has secured to its lower face a mold member 14 having a half-cavity in its lower face only, and the lowermost mold member, 15, has a half-cavity in only its upper face.

Figure 3:
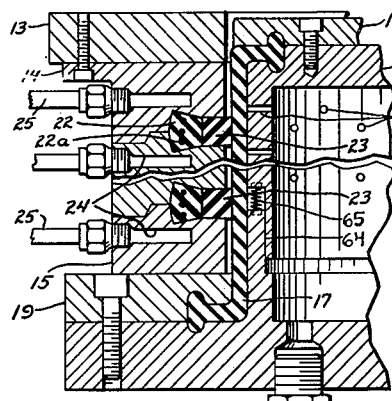
Fig. 3 is a radial, fragmentary section of stacked and fully closed annular molds, the work therein, and parts of the apparatus with which the molds are closely associated, taken at a different position, circumferentially of the assembly, from that at which the section shown in Fig. 4 is taken.

Suitable means are provided, permissibly as hereinafter described, for raising and lowering the upper press member 13, and preferably for automatically stopping it at suitable positions for the emptying and refilling of the molds in succession at a working position of convenient height, at the top of a work-table and fluid-confining structure of which the top element is designated 16, Figs. 1 and 3.

This member 16 serves as a table-top and also as a clamping plate for the beaded annular upper margin (Fig. 3) of an annular diaphragm 17, clamping it sealingly against the top of the crown of a hollow, hat-shaped fluid-confining member 18, to the base of which the beaded lower margin of the annular diaphragm 17 is sealingly clamped by a ring 19 upon which the lowermost mold member, 15, comes to rest when the press is closed.

Figure 9:
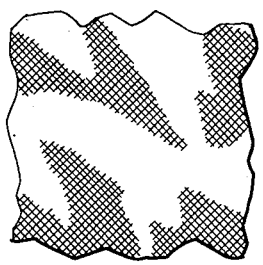
Fig. 9 is a fragmentary face view of a part shown in Fig. 3.

The diaphragm 17 preferably, but not necessarily, is reinforced with bias fabric, as in Fig. 9, so that its circumferential stretch will be substantially uniform. To permit the diaphragm 17 to shorten in height, so that it can more freely stretch in circumference, the hat-shaped structure preferably is made in two parts which are guidingly telescoped with each other at 64 and provided with compression springs such as the spring 65 for urging them apart.

The interior of the hollow member 18 can be put in communication, through a pipe 20 coupled to a hole in its floor, with a source of pressure fluid, and the annular wall of the member 18 is formed with holes 21, 21 for conducting the fluid to the inner face of the diaphragm, to expand it, when the molds are all fully closed.

For transmitting the force of the diaphragm to the belts, 22, 22, each belt has interposed between it and the diaphragm a vulcanized rubber molding ring 23 adapted to be stretched by expansion of the diaphragm and thus to be pressed against the inner peripheral face of the belt, each molding ring 23 being slidably mounted in an annular guideway defined by parallel flat faces of the adjacent mold members.

Thus the rubber rings 23, 23 are adapted to put the belts and their cores, 22ᵃ, 22ᵃ, in the tensioned condition in which, for known reasons, it is desirable that they be held during vulcanization. As the belts are made with such precision as to closely approximate the size and shape of the mold cavities, and are deformable to a condition of increased inner-peripheral width by the pressure of the molding rings, the rings cause the belts to fill out at their side walls against the converging walls of the mold cavity even though the molding rings press the belts from the narrow inner part toward the wider outer part of the mold cavity. Preferably the unvulcanized belts, as put into the molds, are of such cross-sectional size and shape as to permit the molds to close fully, before the outward pressing by the rubber molding rings begins, so that little or no mold fin or flash will occur at the parting plane of the molds, on the back of the belt, and so that there will be enough deforming of the belts by the rubber molding rings to put the belt cores 22ᵃ, 22ᵃ under high tension.

For suitably heating the molds for vulcanizing the belts any suitable provisions can be made, as by forming the mold members with respective steam chambers 24, 24 and providing the assembly with suitable flexible steam pipes 25, 25, 26, 26, for circulating steam through the series of molds.

The sliding fit of the molding rings 23 in their guideways prevents the forming of flash and as the molding rings project a substantial distance inward from the inner peripheries of the molds the diaphragm is not required to bulge into the guideways.

Means is provided for raising and lowering the upper press member 13, and for finally forcing it downwardly, but with a yielding pressure, for holding the molds of the stack firmly closed. Such means, in the embodiment here shown, Fig. 1, comprises a pair of guide posts 27, 27 secured to and extending upward from the base 10, through respective guide sleeves 28, 28 secured to and extending downward from the upper press member 13.

Near their upper ends the posts 27 are connected by a bridge piece 29 slidably mounted upon them and having secured to its upper face an arch-like bracket or yoke 30 which is drawn against the ceiling 31 of the room by screws 32, 32. Compression springs 33, 33, are mounted between the upper face of the bridge piece 29 and respective nuts 33ᵃ, 33ᵃ, on the upper ends of the posts, and can be put under suitable compression by tightening of the nuts.

This construction provides for cushioning of vibration by the springs 33, in conjunction with strong holding of the posts 27 accurately in vertical position, and adaptation of the apparatus to the ceiling height. The threading of the posts extends from their upper ends to a position far below the bridge member 29 and screwed upon them, below the bridge piece 29, are respective swivel nuts 34, 34 each formed as a sprocket wheel. Each swivel nut is provided with a thrust bearing 35 between it and the top reach of a hold-down arch bracket 36 secured to and extending upward from the upper press member 13, and with a thrust bearing 37 between the swivel-nut and a compression spring 38 surrounding the post 27 and seated upon the upper face of the member 13.

The swivel-nut sprockets 34 are connected by respective sprocket-chains 39, 39 with respective sprockets secured upon the output shaft 40 of a speed reducer 41 driven by a reversible motor 42, both mounted on the member 13.

At three circumferentially spaced positions the mold members are connected each to the next by a series of toggles of which each comprises an arm 43 hinged at 44 to a bracket projecting from the next higher mold member, and a pair of arms 45, 45 hinged at 46 to a bracket projecting from the next lower mold member, the elbow of the toggle being at 47. Each arm 43 projects beyond the elbow of the toggle and at its outer end is provided with a pin 49 which projects horizontally from each of the arm's side faces and is thus adapted to abut the outer edge faces of the arms 45, 45 to limit the straightening movement of the toggle and thus to hold the lower one of the two mold members, against gravity, at a determinate distance from the upper one, as the molds are successively opened.

The projecting end portions of the pins 49 also are adapted to enter, in their downward movement, respective guide grooves, such as the groove shown on the inner side faces of a channel shaped post 51 secured to and extending upward from the base 10.

Each guide groove has at its upper end a flared open mouth 50ᵃ for receiving the pin; next to that an oblique cam reach 50ᵇ for controlling the action of the toggle as the two mold sections close and for exerting closing force upon them; and below that a long vertical reach 50ᶜ for continuing to steady and guide the series of closed molds as they descend to rest upon the clamping ring 19 as in Fig. 3.

In order that the three pins 49 may not have to sustain the weight of all of the closed molds while they are being lowered and the pins are effecting the closing of successive molds, three sets of pick-up counterweights are provided, at three respective circumferentially spaced positions.

In each set (Fig. 1), the counter-weights are of successively less diameters from the highest one, 52ᵃ, to the lowest one, 53, but each is of such vertical dimension that the three of each diameter-size are in weight equal to or almost equal to the weight of one of the mold members 12ᵃ, 12ᵇ, etc., except that the three lowermost weights, of which the weight 53 is one, are equal or almost equal in weight to the lowermost, single-cavitied mold member 15.

Each set of counterweights, 52ᵃ to 53, is slidably strung on a cable 54 which extends through holes at their centers and has a retaining head 55 on its lower end, abutting the lower face of the lowermost counterweight 53.

Figure 1:
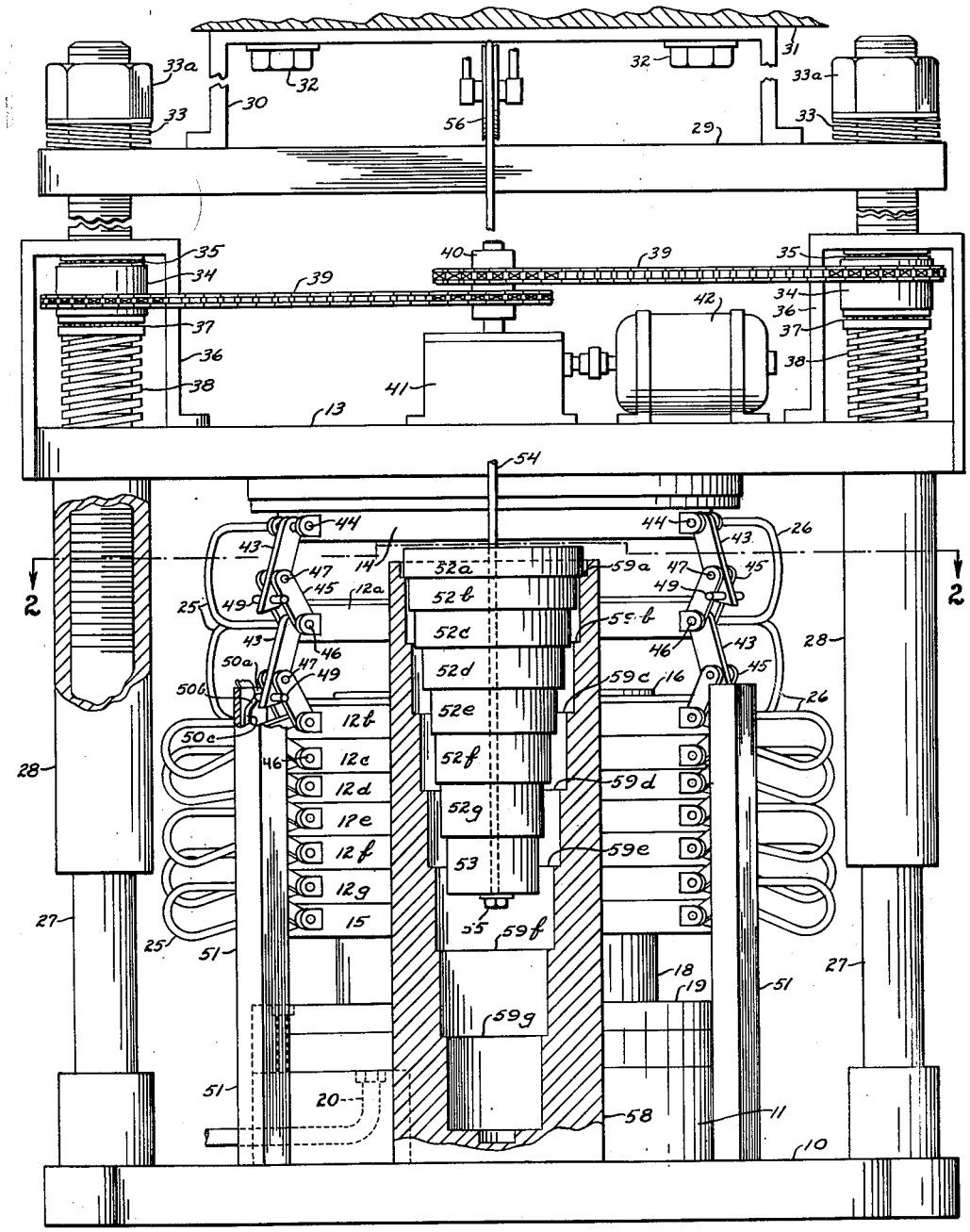
Fig. 1 is an elevation, with parts sectioned and broken away, of apparatus embodying my invention in its preferred form as applied to the molding of annular articles such as V-belts.
Figure 2:
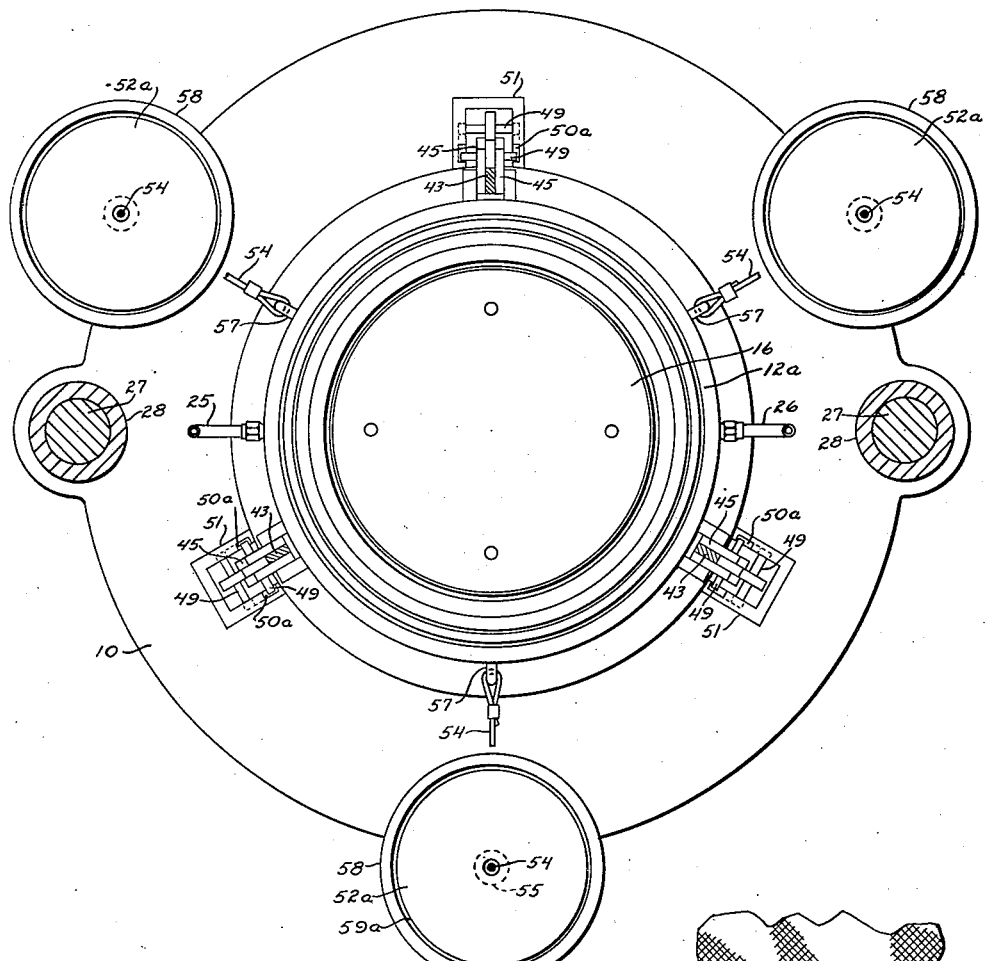
Fig. 2 is a section on line 2—2 of Fig. 1.

Each cable 54 extends upward from the weights, over two overhead pulleys in tandem, one of which pulleys is shown at 56, Fig. 1, and from the second pulley the cable extends downward to an anchorage lug 57 (Fig. 2) projecting from the lowermost mold member 15. For clarity of illustration the cables 54 are shown in Fig. 2 as being out of their true vertical positions.

Each set of counterweights is mounted inside of a hollow post 58 standing up from the base 10 and internally formed with a succession of shoulders or ledges, such as the ledges 59, 59ᵃ, but of successively smaller diameters in downward sequence. These ledges are so spaced apart vertically as to be adapted to stop and support in succession the series of counterweights as the latter are lowered by the lifting of the stack of unopened molds to bring the molds in succession to, and successively open them at approximately the level of the work table 16.

Thus the counterweights are adapted to almost fully counterbalance, at all times, only the mold members that are below the mold-opening and mold-closing position, so that the wall of the cam portions 50$^b$ of the guide grooves 50 will have to act against the pin 49 with only sufficient force to augment the upward pull of the toggles as a mold-opening force or to augment the force of the counterweights in the closing of the molds as each mold member is lowered onto the stack of previously closed molds.

When each cable 54 is trained over two tandem overhead pulleys, as above described, both the on-running and the off-running reaches of the cable can be vertical although one or more of the sets of counterweights may be at a sufficient distance from the stack of molds to provide good access to the molds for filling and emptying them.

Figure 8:
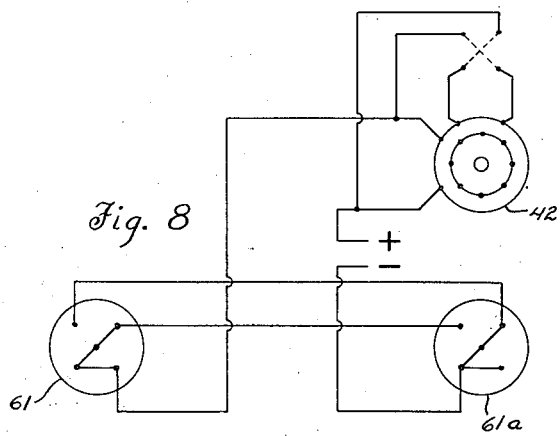
Fig. 8 is a diagram of the motor, switches and wiring.
Figure 4:
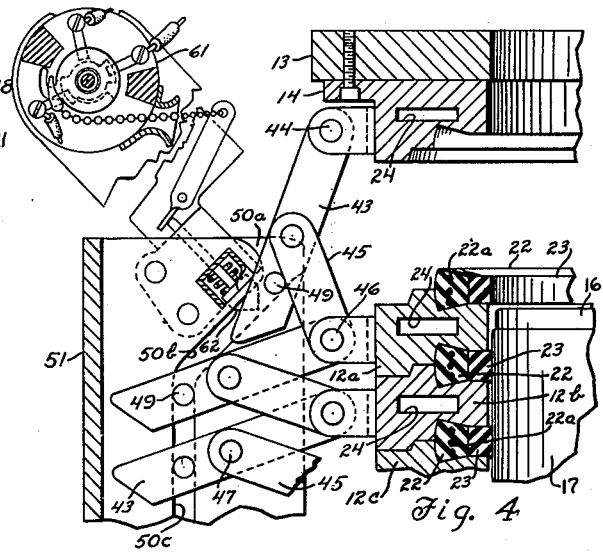
Fig. 4 is a section corresponding to that of Fig. 3 except that it is taken at a different position circumferentially of the assembly and shows a central fluid chamber in elevation instead of in section.

If desired, the electric circuit of the motor can include a cam-actuated switch 61, Fig. 4, mounted upon a side wall of one of the channel posts 51 and having an actuating stem formed with a two-faced cam head 62 extending into the path of the pins 49 and adapted to be crowded by each pin for opening the motor circuit as each pin passes the stem 62, in either direction of movement, for automatically stopping the upward or downward movement of the upper press member 13 as each successive mold member arrives at the loading and unloading position. Suitable switch circuits for this purpose are known to those skilled in the art. As one expedient, a three-way ratchet switch 61 as shown and a manually actuated three-way switch 61$^a$, Fig. 8, can be mounted in series in the motor circuit, the two having structural features and the relationship of switches commonly employed respectively at the top and bottom of stairways, for turning the stair light on or off from either the top or the bottom of the stairs.

In the operation of this apparatus, Figs. 1 to 4, assuming that the parts are in the positions in which they are shown in Fig. 1, and that an unloading of the stack of molds is in progress, the motor is started manually to raise the press head 13 to lift the mold member 12$^b$ from the next lower mold member 12$^c$ and space it therefrom the distance permitted by the straightening of the toggles between mold 12$^b$ and mold 12$^c$, and to lift the mold 12$^c$ to the position formerly occupied by 12$^b$.

When the mold 12$^c$ has reached the unloading position, and has been thus opened, the motor is stopped, either by manually opening a motor switch or automatically by the adjacent pin 49 acting as a cam against the switch stem 62 and changing the setting of the three-way ratchet switch 61. The mold-vulcanized belt is then removed from the mold member, the motor is again started for repetition of the described operation for emptying the mold member 12$^d$, and so on until all of the mold members have been emptied, at which time the lowermost, single cavitied, mold member, 15, will be at the unloading position, and all of the counterweights 52$^a$ to 52$^g$ will have come to rest successively, at appropriate times, on their respective ledges, while the lowermost mold member, 15, will still be counterbalanced by the lowermost counterweight, 53, still bearing its full weight on the cable-head 55.

The motor is then reversed for refilling and reclosing of the molds in succession. The starting and stopping of the motor and the other operations are analogous to, and will be manifest from, those just described.

When all of the molds have been filled and closed and lowered until the weight of all of them bears upon the member 19, the motor is further driven just long enough to compress the springs 38 adequately for putting appropriate yielding pressure on the molds to hold them firmly closed.

The construction and arrangement are as described are such that at all times, in both the upward and the downward operation, all of the molds that are not being wholly or chiefly supported by the upward pull of toggles, will be closely counterbalanced, so that the strain on the pins 49 is not excessive.

When the filled and closed molds are in place upon the member 19, and thus surround the diaphragm 17, the belts are vulcanized by heat from steam circulated in the chambers 24 while fluid pressure, provided by the pipe 20, is maintained within the annular diaphragm to urge the stretchable rubber molding rings 23 constantly outward to mold the inner peripheral faces of the belts, to stretch the belt cores 22$^a$, and to compel each belt to take the shape of its mold cavity at its outer peripheral face and at its two diverging side faces.

When the mold-vulcanizing operation is finished the mold-opening, emptying and refilling operations are performed as above described.

In those operations the dome-like diaphragm-clamping assembly provides a convenient table to facilitate the handling of the belts as they are taken from or put into the molds.

Figure 5:
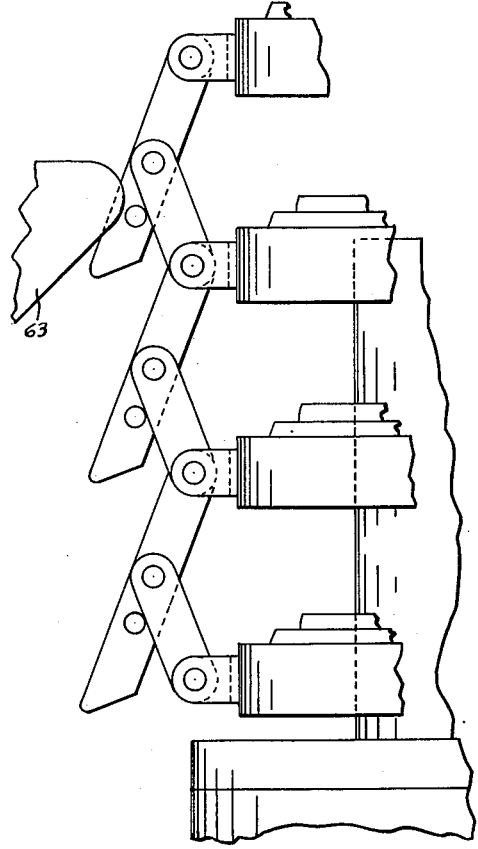
Fig. 5 is a fragmentary elevation of a set of articulated molds representing a modification.

The modification illustrated in Fig. 5 differs from that of Figs. 1 to 4 only in that the counterweight system and the cam-action posts 51 are omitted, which permits each mold to open at any elevation, whenever it sustains sufficient weight of molds below it to effect its opening. In this case stationary, single-face cam members such as the member 63 can be mounted at about the level of the top of the work table, to make sure that the molds will open at that position although too firmly stuck to be opened by gravity, and a switch 61$^a$, corresponding to the switch 61 of Fig. 4, can be employed for automatically stopping the motor.

Figure 6:
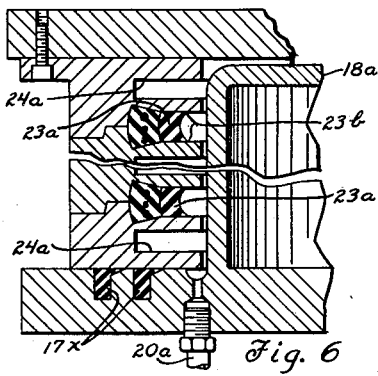
Fig. 6 is a radial, fragmentary section illustrating a modification of work-pressing elements.

In the modification shown in Fig. 6, each rubber molding ring, 23$^a$, 23$^a$, is formed with a pair of sealing lips 23$^b$, 23$^b$ sealing against the respective adjacent mold faces under the force of fluid pressure in the annular space between the molds and an imperforate dome portion of a work-table member 18$^a$, the pressure being supplied through a pipe 20$^a$ coupled to a hole through the base flange of the member 18$^a$. The diaphragm is omitted and the central space of the uppermost mold member, 14$^a$, is closed and sealed by a plate 13$^a$ carried by the upper press member, and lip-sealing rings 17$^x$, 17$^x$ are mounted in grooves in the upper face of the base flange of the member 18$^a$ and are adapted to seal against the lower face of the lowermost mold member.

In this embodiment the rubber molding rings 23$^a$ are shown as being shaped to mold the inner peripheral faces of the belts to concave shape. In this case the mold's steam chambers, 24$^a$, 24$^a$, are open to the annular space above mentioned, and the same body of steam can be used for both heating and pressing the belts.

Figure 7:
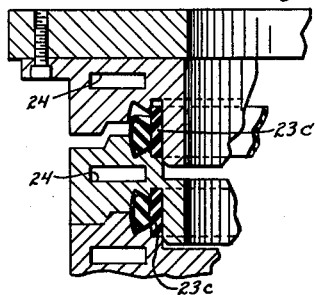
Fig. 7 is a similar section illustrating another alternative provision for pressing the work.

In the embodiment shown in Fig. 7, rubber molding rings, 23$^c$, 23$^c$, are shown of such cross-sectional form and in such relationship as to effect the stretching and pressing of the belts by being axially compressed and thus radially thickened by being squeezed between the two adjacent mold members as the latter are forced together. Preferably each rubber ring 23ᶜ is seated in a groove in the lower one of the two mold members, as shown, and is adapted for its upper annular margin to be received in a similar groove in the lower face of the upper one of the two mold members, as is also shown. The proportions preferably are such that the rubber molding ring will undergo most of its deformation after the mold members are almost completely closed, and before the belt (usually fabric covered) has developed such pressure of its back against the radially outer mold-cavity walls as to cause excessive pinching of cover fabric or extrusion of stock at the parting plane.

Other modifications are possible without departure from the scope of the invention as defined in the appended claims.

I claim:

1. Apparatus for concurrently molding a plurality of annular V belts, said apparatus comprising a plurality of pairs of steam-jacket, mating annular mold sections adapted to be stacked and thus to define a plurality of annular molding cavities each of which is of V-belt tapered shape from its radially outer side to its radially inner side and has, in direct, uninterrupted continuation of said cavity, at its radially inner side, and open to the inner-peripheral external faces of the mold sections, an annular guide space for a molding ring, an unattached, stretchable molding ring in each of said guide spaces, and means for locally exerting the force of a single body of pressure fluid against the external faces of the plurality of molding rings that are farthest inward, toward the center of the assembly from the molding cavities, said means so confining said fluid that it exerts radial fluid pressure against said rings uniformly throughout the circle of the assembly, for forcing the molding rings radially outward in said guide spaces.

2. Apparatus as defined in claim 1 in which the molding rings seal against the guide-space-defining faces of the mold sections and in which the means for applying the force of pressure fluid confines the fluid in contact with the radially inner faces of the molding rings.

3. Apparatus as defined in claim 1 in which the molding rings seal against the guide-space-defining faces of the mold sections and in which the means for applying the force of pressure fluid confines the fluid in contact with the radially inner faces of the molding rings and in which each mold member is formed with a steam-jacket cavity in communication with the fluid-containing space defined by the said means.

4. Apparatus as defined in claim 1 in which each molding ring is formed with a pair of annular sealing lips and thus seals against the guide-space-defining faces of the mold sections and in which the means for applying the force of pressure fluid confines the fluid in contact with the radially inner faces of the molding rings.

5. Apparatus as defined in claim 1 in which each of the recited rings is accessible by reason of its guide space being open as recited in claim 1, in which the inner periphery of each ring is approximately at the radially inner mouth of its guide space, and in which the means for exerting the force of pressure fluid as recited comprises an annular diaphragm separate from the molding rings and adapted to be expanded in pressure contact with the radially inner face of the molding rings.

6. Molding apparatus comprising a pair of aligned press-head members and means for moving one of the same toward and from the other, the said members and means constituting the primary elements of a press, a set of aligned annular mold-cavity members mounted in series in the press and adapted to be brought together by it to define a plurality of annular molding cavities in series and a central space in communication with the said cavities collectively for applying to the contents of said cavities the force of pressure fluid contained in said central space, and tension spacer means for limiting movement of each mold member away from the next mold member of the series, each spacer means being attached, at the respective ends of said spacer means, to two of the mold members, the spacer means thus directly connecting the mold members in series, said spacer means being collapsible for permitting closing relative movement of the mold members.

7. Apparatus as defined in claim 6 in which each of the recited spacer means is a toggle.

8. Apparatus as defined in claim 6 in which each of the recited spacer means is a toggle and in which the assembly includes means for stopping the straightening action of the toggles short of a fully straightened condition in the opening relative movement of the mold members.

9. Apparatus as defined in claim 6 in which each of the recited spacer means is a toggle, and in which the assembly includes means on the respective toggles for stopping the straightening action of the toggles short of a fully straightened condition in the opening relative movement of the mold members.

10. Apparatus as defined in claim 6 in which each of the defined spacer means comprises a toggle and in which the assembly includes cam means for urging a toggle toward straightened condition, as an incident of press-opening relative movement of the press-head members, for assuring separation of the two mold members that the toggle connects.

11. Apparatus as defined in claim 6 in which each of the defined spacer means comprises a toggle and in which the assembly includes cam means for urging a toggle toward collapsed condition, as an incident of press-closing relative movement of the press-head members, for assuring closing of the two mold members that the toggle connects.

12. Molding apparatus comprising a vertical press having an upper press head and a lower press head of which the upper head is vertically movable, means for raising and lowering said upper head, and a set of mold-cavitated members adapted to be stacked in succession upon the lower press head by the lowering of the upper press head to define a plurality of mold cavities, the uppermost mold member being connected to the upper press head to be raised and lowered thereby and each mold member being directly connected to the next one below it by tension spacer means for limiting opening relative movement of the two, and collapsible for permitting their closing movement, and the lowermost mold member being free to rise from the lower press head in response to upward pull of the tension spacer means.

13. Apparatus as defined in claim 12 and including means for counterweighting such of the mold members as are, at a given time, below a determinate elevation.

14. Apparatus as defined in claim 12 and including means for counterweighting such of the mold members as are, at a given time, below a determinate elevation, the counterweighting means comprising a plurality of counterweights individual to a plurality of the mold members respectively and lost-motion means for causing each mold member to have its respective counterweight made effective as the mold member descends past a determinate position and made ineffective as the mold member ascends past a determinate position.

15. Apparatus as defined in claim 12 and including means for counterweighting such of the mold members as are, at a given time, below a determinate elevation, the counterweighting means comprising a lowermost counterweight for the lowermost mold member, flexible means and guiding means therefor constituting the operative connection of the said mold member and its counterweight, respective counterweights individual to others of the mold members, and adapted to be picked up in succession by the said lowermost counterweight as it is raised by descent by the lowermost mold member, and means for receiving and supporting the said respective counterweights in succession at determinate positions as the lowermost counterweight is lowered by ascent of the lowermost mold member.

16. Apparatus as defined in claim 12 and including means for counterweighting such of the mold members as are, at a given time, below a determinate elevation, the assembly including a work table in position to facilitate the manipulation of the work in relation to the mold members in succession at substantially the said elevation.

17. Apparatus for concurrently molding a plurality of annular articles, said apparatus comprising a vertical press, a set of axially aligned annular mold members adapted to be stacked in said press to define a plurality of annular molding cavities open at their radially inner sides, means at the open inner sides of the cavities, when the molds are so stacked, for exerting the force of fluid pressure concurrently against the radially inner faces of articles to be molded in the respective cavities, said means comprising a fluid-retaining and work-table structure in the central space defined by the stacked annular mold members, and means for bringing the mold members successively to and stopping them approximately at the level of the top of said structure.

18. Apparatus as defined in claim 17 in which the upper press-head is the movable press-head, the uppermost mold member is secured to it, and each mold member is connected to the one next below it by tension spacer means for limiting opening relative movement of the two and collapsible for permitting their closing relative movement.

19. Apparatus as defined in claim 17 in which the upper press-head is the movable press-head, the uppermost mold member is secured to it, and each mold member is connected to the one next below it by tension spacer means for limiting opening relative movement of the two and collapsible for permitting their closing relative movement, and in which the assembly includes means for stopping the mold members as recited comprising a contact-actuated member and contact means on the respective mold members for successively actuating it.

20. Apparatus for concurrently molding a plurality of annular articles, said apparatus comprising a plurality of annular mold members adapted to be brought together, each against the next, in series, and each, with the next, defining an annular molding cavity in communication with the central space defined by the annular mold members, means for closing the ends of said space to form a pressure-fluid chamber, and means for conducting pressure fluid into said chamber, the assembly including deformable means, adapted to confine the pressure fluid by sealing against two adjacent ones of the mold members, for exerting, against an article in the molding cavity defined by them, the force of the pressure fluid in the said chamber.

21. Apparatus for molding an annular article, said apparatus comprising means defining an annular molding cavity communicating at one of its peripheries with an annular guide space for a molding ring, a deformable molding ring in said guide space, and means for so deforming the molding ring as to cause it to press against an article to be molded in the cavity, the cavity-defining means comprising a pair of mold members each defining an annular part of the cavity when they are brought together and the said members and the molding ring being shaped and proportioned for radial thickening of the ring by axial pressure of the mold members as they are brought together.

22. Apparatus for concurrently molding a plurality of annular articles, said apparatus comprising a plurality of annular mold members adapted to be brought together, each against the next, in series, and each, with the next, defining an annular molding cavity in communication with the central space defined by the annular mold members, means for closing the ends of said space to form a pressure-fluid chamber, and means for conducting pressure fluid into said chamber, each of the mold members being formed with a steam-jacket cavity in communication with the said central space.

WALTER A. SPIERS.

REFERENCES CITED

The following references are of record in the file of this patent:

UNITED STATES PATENTS

| Number | Name | Date |
| --- | --- | --- |
| 260,368 | Buzzell | July 4, 1882 |
| 294,318 | Hawley | Feb. 26, 1884 |
| 601,825 | Conners | Apr. 5, 1898 |
| 652,813 | Seiberling | July 3, 1900 |
| 660,638 | Holbrook et al. | Oct. 30, 1900 |
| 890,409 | Cox | June 9, 1908 |
| 1,172,783 | French | Feb. 22, 1916 |
| 1,296,291 | James et al. | Mar. 4, 1919 |
| 1,354,595 | Borman | Oct. 5, 1920 |
| 1,414,507 | Gammeter | May 2, 1922 |
| 1,482,185 | Egerton | Jan. 29, 1924 |
| 2,054,572 | McKenna | Sept. 15, 1936 |
| 2,101,508 | Pryale et al. | Dec. 7, 1937 |
| 2,172,243 | Goodnow et al. | Sept. 5, 1939 |
| 2,253,792 | Leavenworth | Aug. 26, 1941 |
| 2,342,378 | Smith | Feb. 22, 1944 |
| 2,420,813 | Camerota | May 20, 1947 |
| 2,518,137 | Gorecki | Aug. 8, 1950 |